(12) United States Patent
Li et al.

(10) Patent No.: US 11,182,586 B2
(45) Date of Patent: Nov. 23, 2021

(54) BACKGROUND SUBTRACTION METHOD, IMAGE MODULE, AND OPTICAL FINGERPRINT IDENTIFICATION SYSTEM

(71) Applicant: SHENZHEN GOODIX TECHNOLOGY CO., LTD., Guangdong (CN)

(72) Inventors: Chung-Te Li, Guangdong (CN); Chieh-Wei Lo, Guangdong (CN); Chih-Long Hsu, Guangdong (CN)

(73) Assignee: SHENZHEN GOODIX TECHNOLOGY CO., LTD., Guangdong (CN)

(*) Notice: Subject to any disclaimer, the term of this patent is extended or adjusted under 35 U.S.C. 154(b) by 258 days.

(21) Appl. No.: 16/657,852

(22) Filed: Oct. 18, 2019

(65) Prior Publication Data
US 2020/0050828 A1    Feb. 13, 2020

Related U.S. Application Data

(63) Continuation of application No. PCT/CN2017/112868, filed on Nov. 24, 2017.

(51) Int. Cl.
*G06K 9/00*    (2006.01)
*G06T 5/50*    (2006.01)
*G06T 5/00*    (2006.01)

(52) U.S. Cl.
CPC ..... *G06K 9/00067* (2013.01); *G06K 9/00046* (2013.01); *G06T 5/002* (2013.01); *G06T 5/50* (2013.01); *G06T 2207/20224* (2013.01)

(58) Field of Classification Search
CPC ............ G06K 9/00067; G06K 9/0004; G06K 9/6202; G06K 9/00046;
(Continued)

(56) References Cited

U.S. PATENT DOCUMENTS

2001/0040987 A1* 11/2001 Bjorn ................ G07F 7/1008
                                                        382/124
2010/0172581 A1*  7/2010 Husoy ................. G06T 7/90
                                                        382/165
(Continued)

FOREIGN PATENT DOCUMENTS

CN        101210876 A     7/2008
CN        101210876 A     7/2008
(Continued)

OTHER PUBLICATIONS

Foudil Belhadj; Samy Ait Aoudia; Samir Akrouf; "SecureFingerprint-based authentication and non-repudiation services for mobile learning systems", Nov. 2015, DOI:10.1109/IMCTL.2015.7359586; Conference: IMCL 2015 IEEE At: Thessaloniki Greece vol. 200-204.
(Continued)

*Primary Examiner* — Michael J Vanchy, Jr.
(74) *Attorney, Agent, or Firm* — WPAT, P.C., Intellectual Property Attorneys; Anthony King

(57) ABSTRACT

A background subtraction method includes: obtaining a first background image corresponding to a first object, wherein the first object has a first reflectivity; obtaining a second background image corresponding to a second object, wherein the second object has a second reflectivity, and the first reflectivity is different from the second reflectivity; calculating a plurality of relative values of the first background image relative to the second background image so as to obtain a mask image; obtaining a target image; subtracting the second background image from the target image so as to obtain a first background-removed image; and calculating and outputting a second background-removed image according to the first background image, the second background image, the first background-removed image and the mask image.

12 Claims, 3 Drawing Sheets

(58) Field of Classification Search
CPC ............. G06T 2207/20224; G06T 5/50; G06T 2207/20024; G06T 2207/20056; G06T 2207/20216; G06T 5/002
See application file for complete search history.

(56) References Cited

U.S. PATENT DOCUMENTS

2010/0271336 A1* 10/2010 Harada .................. G06F 3/042
 345/175
2014/0268217 A1 9/2014 Kawata et al.

FOREIGN PATENT DOCUMENTS

| CN | 101339613 | A | 1/2009 |
|----|-----------|---|--------|
| CN | 101339613 | A | 1/2009 |
| CN | 102446034 | A | 5/2012 |
| CN | 102999750 | A | 3/2013 |
| CN | 106203365 |   | 12/2016 |
| CN | 106203365 | A | 12/2016 |
| CN | 106203365 | A | 12/2016 |
| CN | 106228123 | A | 12/2016 |
| CN | 106228123 | A | 12/2016 |
| CN | 106949488 | A | 7/2017 |
| CN | 107085701 | A | 8/2017 |
| EP | 3435280 | A1 | 1/2019 |
| WO | WO 2017129126 |   | 8/2017 |
| WO | WO2019100329 | A1 | 5/2019 |

OTHER PUBLICATIONS

Yu Zhao-Chai, "A segmenting algorithm based on standard deviation for fingerprint images", p. 88-90, Journal of Minjiang University, Ceneral Serial No. 142, No. 2, 2014.
English Abstract of CN101210876A.
English Abstract of CN101339613A.
English Abstract of CN102446034A.
English Abstract of CN102999750A.
English Abstract of CN106203365A.
English Abstract of CN106228123A.
English Abstract of CN106949488A.
English Abstract of CN107085701A.
English Abstract Translation for Foreign Reference CN106203365A.
English Abstract Translation for Foreign Reference CN106228123A.
English Abstract Translation for Foreign Reference CN101339613A.
English Abstract Translation for Foreign Reference CN101210876A.
International Search Report in Chinese (Form PCT/ISA/210).
English Abstract Translation of Foreign Reference CN106203365A.

* cited by examiner

BACKGROUND SUBTRACTION METHOD, IMAGE MODULE, AND OPTICAL FINGERPRINT IDENTIFICATION SYSTEM

CROSS-REFERENCE TO RELATED APPLICATIONS

The present application is a continuation of international application No. PCT/CN2017/112868, filed on Nov. 24, 2017, of which is incorporated herein by reference in its entirety.

TECHNICAL FIELD

The present invention is related to a background subtraction method, an image module and an optical fingerprint identification system; in particular, to a background subtraction method, image module and optical fingerprint identification system eliminating interference effectively.

BACKGROUND

With the advancement of technology, mobile phones, digital cameras, tablet computers, notebook computers and other portable electronic devices have become an indispensable to our daily lives. Since portable electronic devices are mostly for personal uses, they contain a certain level of private information, and hence, the data stored therein, such as the contacts, photos, personal information, etc. are privately owned. Once the electronic device is lost, these data may be used by others, thereby resulting in unnecessary losses and damages. Although one can use the password protection to prevent others from using the electronic device, passwords can be leaked or cracked easily, and hence the security level of password protection is relatively low. Also, users have to remember password in order to use electronic devices, and if the user forgets your password, it will cause a lot of inconvenience. Therefore, personal fingerprint identification systems have been developed to achieve the purpose of authentication so as to enhance data security.

On the other hand, with the advancement of fingerprint identification technology, invisible fingerprint sensors (IFS) have gained increasing favor from consumers, gradually. In the invisible fingerprint sensor technology, an optical fingerprint sensor may be disposed under the touch screen (i.e., an under-display fingerprint sensing). In other words, the user press through the touch screen for implementing fingerprint identification.

Further, the prior art has developed a background subtraction technology, which can remove the background image so that the image of the meaningful signals is more significant. However, in the application of optical fingerprint identification, the touch screen not only has the display components arranged in an array (such as an organic light emitting diode (OLED)) but also has components or materials, such as an indium tin oxide (ITO) transparent conductive film, a conductive silver paste, an ITO substrate, an optical clear adhesive (OCA) optical gel, etc., related to the touch control function disposed on the display component. Since the signals between finger ridges and finger valleys of the fingerprint image are quite small, and the light transmittances of the above-mentioned components/materials related to the touch control function at each pixel position are different, plus the light reflectivity of the user's finger and the light reflectivity of the background object used to create the background image are different, interference to the fingerprint image takes place when implementing the optical fingerprint identification. In other words, because of the difference between the reflectivity of the user's finger and the reflectivity of the background object used to create the background image, the application of the existing background subtraction technology alone cannot effectively eliminate the interference, thereby jeopardizing the accuracy of the optical fingerprint identification.

In view of the foregoing, one goal of the related field aims to provide a background subtraction technology that can effectively eliminate the interference.

BRIEF SUMMARY OF THE INVENTION

In view of the foregoing, the purpose of some embodiments of the present invention is to provide a background subtraction method, image module and optical fingerprint identification system capable of effectively eliminating the interference so as to address the disadvantages in the existing art.

To address the above-mentioned technical issues, embodiments of the present invention provide a background subtraction method for a background subtraction module. The background subtraction method includes obtaining a first background image corresponding to a first object herein the first object has a uniform color and has a first reflectivity; obtaining a second background image corresponding to a second object, wherein the second object has a uniform color and has a second reflectivity, and the first reflectivity and the second reflectivity are different; calculating a plurality of relative values of the first background image relative to the second background image to obtain a mask image; obtaining a target image; subtracting the second background image from the target image to obtain a first background-removed image; and calculating and outputting a second background-removed image according to the first background image, the second background image, the first background-removed image and the mask image.

For example, the step of calculating the plurality of relative values of the first background image relative to the second background image to obtain the mask image comprises: dividing a plurality of first pixel values of the first background image to the power of one or more by a plurality of second pixel values of the second background image to the power of one or more to obtain the plurality of relative values.

For example, the step of calculating the second background-removed image according to the first background image, the second background image, the first background-removed image and the mask image comprises: multiplying the first background-removed image by the mask image to obtain a first mask-multiplied image; calculating a compensation coefficient according to the first background-removed image, the mask image and the first mask-multiplied image; multiplying the first mask-multiplied image by the compensation coefficient to obtain a compensated image; and adding the first background-removed image with the compensated image to generate the second background-removed image.

For example, the step of calculating the compensation coefficient according to the first background-removed image, the mask image and the first mask-multiplied image comprises: multiplying the first mask-multiplied image by the mask image to obtain a second mask-multiplied image; generating an inverse mask image according to the mask image; multiplying the first background-removed image by the inverse mask image to obtain a first inverse mask-multiplied image; multiplying the first inverse mask-multiplied image by the inverse mask image to obtain a second inverse mask-multiplied image; and calculating the compensation coefficient according to the first mask-multiplied image, the second mask-multiplied image, the first inverse mask-multiplied image and the second inverse mask-multiplied image.

For example, the step of generating the inverse mask image according to the mask image comprises: subtracting the mask image from an all-white image to generate the inverse mask image.

For example, the plurality of relative values are subjected to a normalized operation, so that each mask pixel value in the mask image is between 0 and 1, and each pixel value in the all-white image is 1.

For example, the step of calculating the compensation coefficient according to the first mask-multiplied image, the second mask-multiplied image, the first inverse mask-multiplied image and the second inverse mask-multiplied image comprises: obtaining a first mask-averaged value corresponding to the first mask-multiplied image; obtaining a first inverse mask-averaged value corresponding to the first inverse mask-multiplied image; subtracting the first inverse mask-averaged value from the first mask-averaged value to generate a first subtracted result; obtaining a second mask-averaged value corresponding to the second mask-multiplied image; obtaining a second inverse mask-averaged value corresponding to the second inverse mask-multiplied image; subtracting the second inverse mask-averaged value from the second mask-averaged value to generate a second subtracted result; and calculating the compensation coefficient, which is proportional to the ratio of the first subtracted result and the second subtracted result.

For example, the background subtraction module is disposed under a touch screen of an optical fingerprint identification system.

To address the above-mentioned technical issues, embodiments of the present invention provide an image module, which comprises: an image capturing unit, configured to capture at least one first image of a first object, at least one second image of a second object and a target image, wherein the first object has a uniform color and has a first reflectivity, the second object has a uniform color and has a second reflectivity, and the first reflectivity and the second reflectivity are different; a background subtraction unit, configured to perform the following steps: obtaining a first background image according to the at least one first image, and obtaining a second background image according to the at least one second image; calculating a plurality of relative values of the first background image relative to the second background image to obtain a mask image; subtracting the second background image from the target image to obtain a first background-removed image; and calculating and outputting a second background-removed image according to the first background image, the second background image, the first background-removed image and the mask image.

To address the above-mentioned technical issues, embodiments of the present invention provide an optical fingerprint identification system, disposed in an electronic device, wherein the optical fingerprint identification system comprises: a fingerprint identification module; and an image module, disposed under a touch screen of the electronic device and coupled to the fingerprint identification module, wherein the image module comprises an image capturing unit, configured to capture at least one first image of a first object, at least one second image of a second object and a target image, wherein the first object has a uniform color and has a first reflectivity, the second object has a uniform color and has a second reflectivity, and the first reflectivity and the second reflectivity are different; a background subtraction unit, configured to: obtaining a first background image according to the at least one first image, and obtaining a second background image according to the at least one second image; calculating a plurality of relative values of the first background image relative to the second background image to obtain a mask image; subtracting the second background image from the target image to obtain a first background-removed image; and calculating and outputting a second background-removed image according to the first background image, the second background image, the first background-removed image and the mask image, wherein the fingerprint identification module receives the second background-removed image to implement fingerprint identification according to the second background-removed image.

The present invention uses objects having different reflectivity/color to create a first background image and a second background image, and uses a mask image generated according to the first background image and the second background image, so as to use a first background-removed image generated from a first stage background subtraction (the existing background subtraction technology) calculation to further implement a second stage background subtraction calculation. Compared with the existing technology, the present invention may further eliminate the interference to the image.

DETAILED DESCRIPTION

To further explain the purposes, technical solutions and advantages of the present application, the appended drawings and embodiments are discussed below to give a detailed description of the present invention. It should be noted that the embodiments provided herein are used to explain the present invention, and shall not be used to limit the present application.

In the specification and claims of the present invention, implementing or performing the addition, subtraction, multiplication and division between an image A and an image B means implementing or performing the addition, subtraction, multiplication and division between the elements of the image A and image B. More specifically, multiplying the image A by image B (denoting as A*B) means multiplying the $(i,j)^{th}$ pixel value $a_{i,j}$ of the image A by the $(i,j)^{th}$ pixel value $b_{i,j}$ of the image B; dividing the image A by the image B (denoting as A/B) means dividing the $(i,j)^{th}$ pixel value $a_{i,j}$ of the image A by the $(i,j)^{th}$ pixel value $b_{i,j}$ of the image B; adding the image A and the image B (denoting as A+B) means adding up the $(i,j)^{th}$ pixel value $a_{i,j}$ of the image A and the $(i,j)^{th}$ pixel value $b_{i,j}$ of the image B; subtracting the image B from the image A (denoting as A+B) means subtracting the $(i,j)^{th}$ pixel value $b_{i,j}$ of the image B from the $(i,j)^{th}$ pixel value $a_{i,j}$ of the image A. The averaging value of the image A means the pixel value obtained by averaging all the pixel values of the image A.

Figure 1:
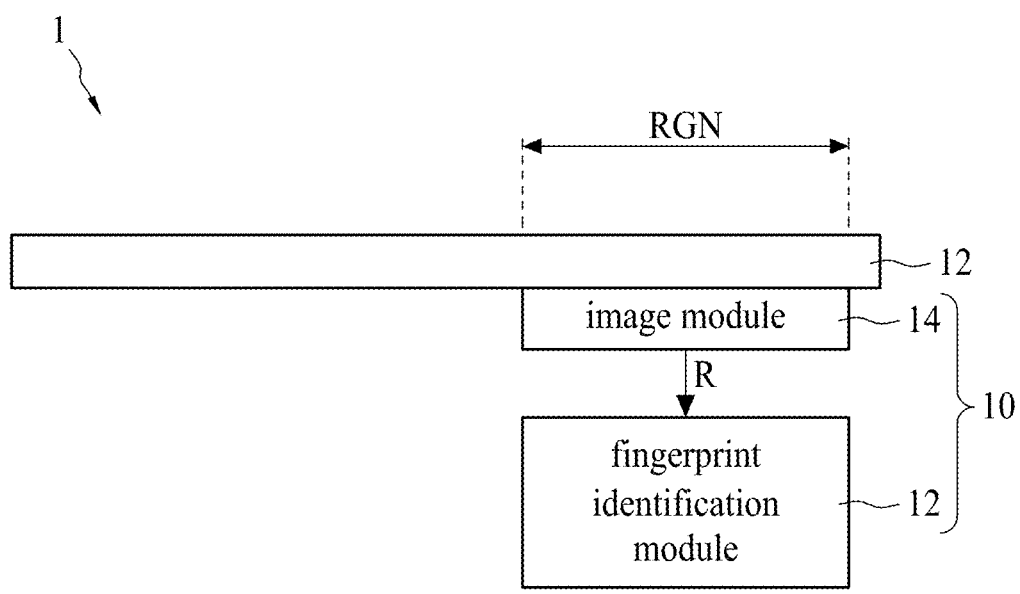
FIG. 1 is a schematic diagram of an optical fingerprint identification system according to embodiments of the present invention.
Figure 2:
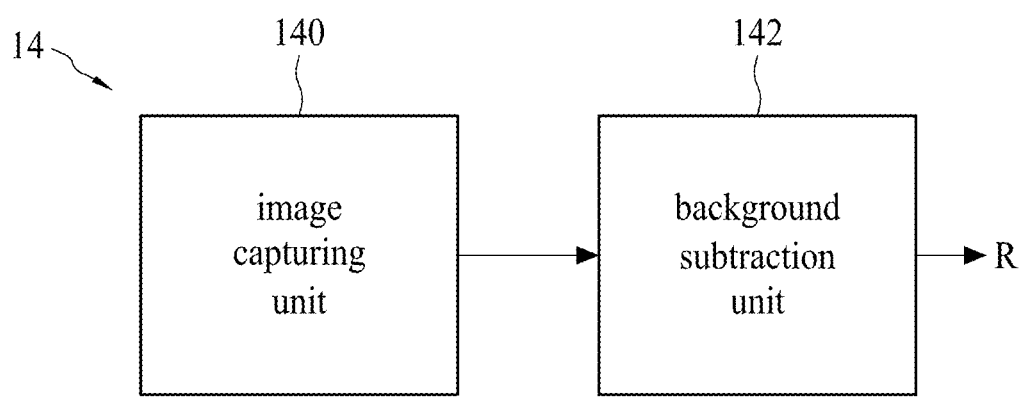
FIG. 2 is a schematic diagram of an image module according to embodiments of the present invention.

Please refer to FIG. 1 and FIG. 2; FIG. 1 is a schematic diagram of an electronic device 1 according to embodiments of the present invention; FIG. 2 is a schematic diagram of an image module 14 according to embodiments of the present invention. The electronic device 1 comprises an optical fingerprint identification system 10 and a touch screen 12, wherein the optical fingerprint identification system 10 comprises the image module 14 and a fingerprint identification module 16, and the image module 14 comprises an image capturing unit 140 and a background subtraction unit 142. The image module 14 is disposed under the touch screen 12 and coupled to the fingerprint identification module 16. The optical fingerprint identification system 10 may implement the under-display fingerprint sensing; that is, the user may implement fingerprint identification by pressing the touch screen 14.

More specifically, the image capturing unit 140 of the image module 14 is disposed under the touch screen 12 directly, and the background subtraction unit 142 may be disposed under the image capturing unit 140 or at other positions (but still under the touch screen 12). The image capturing unit 140 may comprise a plurality of light-sensing devices (e.g., photo diodes (PD)) arranged in an array, and the image capturing unit 140 is configured to capture the image imaged on plurality of light-sensing devices by the light reflected by the touch screen 12 from the region RGN. The background subtraction unit 142 may be implemented using a digital circuit or a digital signal processor (DSP), and the background subtraction unit 142 receives the image captured by the image capturing unit 140 and implements background subtraction to a target image F captured by the image capturing unit 140 so as to generate a background-removed image R, thereby eliminating the interference to the target image F; in this way, the fingerprint identification module 16 may implement fingerprint identification to the background-removed image R. In this example, the interference to the target image F may be the interference to the fingerprint image during the optical fingerprint identification, which is caused by the difference in the light transmittance of the touch-related component/material/circuit (such as the indium tin oxide (ITO) transparent conductive film, conductive silver adhesive, ITO substrate, optical clear adhesive (OCP) optical glue and the like) in the touch screen 12 at different pixel positions, and the reflectivity of the user's finger to light is different from the reflectivity, in a circumstance where the background image is created, of the background object.

Figure 3:
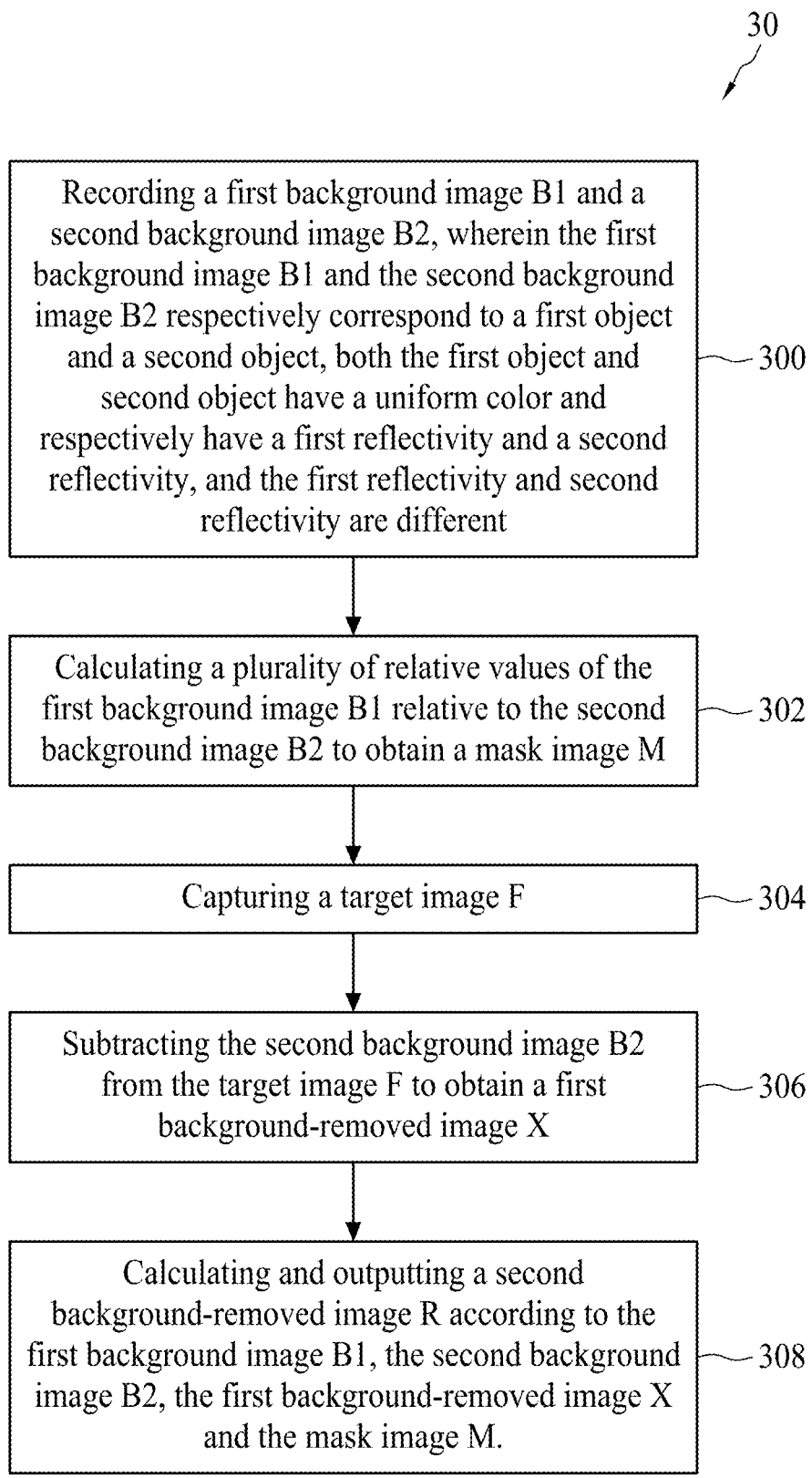
FIG. 3 is a schematic diagram of a background subtraction flow according to embodiments of the present invention.

Please refer to FIG. 3; FIG. 3 is a schematic diagram of a background subtraction flow 30 according to embodiments of the present invention; the background subtraction flow 30 may be implemented by the image module 14 to generate the background-removed image R, wherein the background subtraction flow 30 comprises the following steps:

Step 300: Recording a first background image B1 and a second background image B2, wherein the first background image B1 and the second background image B2 respectively correspond to a first object and a second object, both the first object and second object have a uniform color and respectively have a first reflectivity and a second reflectivity, and the first reflectivity and second reflectivity are different.

Step 302: Calculating a plurality of relative values of the first background image B1 relative to the second background image B2 to obtain a mask image M.

Step 304: Capturing a target image F.

Step 306: Subtracting the second background image 132 from the target image F to obtain a first background-removed image X.

Step 308: Calculating and outputting a second background-removed image R according to the first background image 131, the second background image B2, the first background-removed image X and the mask image M.

In the step 300, the image module 14 records a first background image B1 corresponding to a first object and a second background image B2 corresponding to a second object. In one embodiment, the person operating the electronic device 1 may cover a first object (which may be a uniformly all-black object having a first reflectivity) over a fingerprint sensing region (i.e., the region RGN above the image module 14) of the touch screen 12. At this time, the image capturing unit 140 may capture at least one first image corresponding to the first object/all-black object. Moreover, the operator may cover a second object with a uniform color (which may be a uniformly all-white object having a second reflectivity) over the fingerprint sensing region (i.e., the region RGN above the image module 14) of the touch screen 12. At this time, the image capturing unit 140 may capture at least one second image corresponding to the second object/all-white object. After the image capturing unit 140 captures the at least one first the image and the at least one second image, the background subtraction unit 142 may calculate an average of the at least one first image so as to remove noise in the first image, thereby generating the first background image B1. Moreover, the background subtraction unit 142 may calculate an average of the at least one second image, so as to remove noise in the second image, thereby generating the second background image B2. In this example, the first background image B1 and the second background image B2 correspond respectively to the first object and the second object having different reflectivity (or different object colors). That is, the first reflectivity and the second reflectivity are different, and the first object and the second object may be considered as the background object.

In the step 302, the background subtraction unit 142 calculates a plurality of relative values of the first background image B1 relative to the second background image B2, so as to obtain a mask image M. In one embodiment, the background subtraction unit 142 may calculate the mask image M by dividing the first background image 131 by the second background image 132; in this way, the $(i,j)^{th}$ mask pixel value $m_{i,j}$ of the mask image M is the relative value of the value of the $(i,j)^{th}$ pixel of background image B1 relative to the value of the $(i,j)^{th}$ pixel of the second background image B2, i.e., $m_{i,j}=b1_{i,j}/b2_{i,j}$, wherein $b1_{i,j}$ and $b2_{i,j}$ respectively represent the $(i,j)^{th}$ pixel value of the first background image B1 and mean the $(i,j)^{th}$ pixel value of the second background image B2. The plurality of pixel values of the mask image M (that is, the plurality of relative values of the first background image 131 relative to the second background image B2) reflect the combine effect of the difference in the background object reflectivity and the different light transmittance of the touch-related component/material at different pixel positions. In one embodiment, the mask image M may be subjected to a normalization calculation so that each mask pixel value of the mask image M is between 0 and 1.

In the step 304, the image capturing unit 140 captures a target image F. When the optical fingerprint identification system 10 implements optical fingerprint identification, the user presses his/her finger(s) on the fingerprint sensing region (that is, the region RGN above the image module 14)

of the touch screen 12, the target image F thus captured by the image capturing unit 140 comprises the fingerprint image.

In the step 306 (which may be considered as a first stage background subtraction calculation), the background subtraction unit 142 subtracts the second background image B2 from the target image F, so as to obtain a first background-removed image X, wherein the first background-removed image X may be expressed as X=F−B2.

In the step 308 (which may be considered as a second stage background subtraction calculation), the background subtraction unit 142 calculates and outputs a second background-removed image R according to the first background image 131, the second background image B2, the first background-removed image X and the mask image M. More specifically, the background subtraction unit 142 multiplies the first background-removed image X by the mask image M, so as to obtain a first mask-multiplied image W (the first mask-multiplied image W may be expressed as W=X*M). Next, the background subtraction unit 142 calculates a compensated image C according to the first background-removed image X and the first mask-multiplied image W. Lastly, the background subtraction unit 142 adds the first background-removed image X and the compensated image C, thereby obtaining a second background-removed image R, wherein the second background-removed image R may be expressed as R=X+C. In one embodiment, the compensated image C may be positively proportional to the first mask-multiplied image W. That is, the compensated image C may be expressed as C=g*W, whereas the background subtraction unit 142 may calculate a compensation coefficient g according to the first background-removed image X and the first mask-multiplied image W, thereby calculating the compensated image C.

More specifically, in order to calculate the compensated image C, the background subtraction unit 142 may generate an inverse mask image N according to the mask image M, wherein the inverse mask image N is an inverse image of the mask image M. In other words, if the mask image M is very bright at the position of the (i,j)$^{th}$ pixel, the inverse mask image N is very dark at the position of the (i,j)$^{th}$ pixel, vice versa. In one embodiment, the background subtraction unit 142 may subtract the mask image M from a uniformly all-white the image AWH to generate the inverse mask image N, wherein the inverse mask image N may be expressed as N=AWH−M. In the case that each mask pixel value in the mask image M is between 0 and 1, the pixel value of each pixel in the all-white the image AWH is 1. The background subtraction unit 142 may multiply the first background-removed image X by the inverse mask image N, so as to obtain a first inverse mask-multiplied image B (the first inverse mask-multiplied image B may be expressed as B=X*N). In one embodiment, the background subtraction unit 142 may calculate a compensated image C a compensation coefficient so that the averaging value of pixels in any region of the image R*M is a constant value, or the averaging value of pixels in any region of the image R*N is another constant value.

To this end, the background subtraction unit 142 may again multiply the first inverse mask-multiplied image B by the inverse mask image N, so as to obtain a second inverse mask-multiplied image BN, wherein the second inverse mask-multiplied image BN may be expressed as BN=B*N=X*N*N. On the other hand, the background subtraction unit 142 may again multiply the first mask-multiplied image W by the mask image M, so as to obtain a second mask-multiplied image WM, wherein the second mask-multiplied image WM may be expressed as WM=W*M=X*M*M. The background subtraction unit 142 may calculate a compensation coefficient g according to Equation 1. That is, the background subtraction unit 142 calculates the compensation coefficient g according to the first mask-multiplied image W, the second mask-multiplied image WM, the first inverse mask-multiplied image B and the second inverse mask-multiplied image BN. In this example, mean(W), mean(B), mean(WM), and mean(BN) respectively mean the first mask-averaged value, the first inverse mask-averaged value, the second mask-averaged value, and the second inverse mask-averaged value corresponding to the first mask-multiplied image W, the first inverse mask-multiplied image B, the second mask-multiplied image WM, and the second inverse mask-multiplied image BN.

$$g = -\frac{\text{mean}(WM) - \text{mean}(BN)}{\text{mean}(W) - \text{mean}(B)} \qquad \text{(Equation 1)}$$

In this way, after the background subtraction unit 142 calculates the compensation coefficient g, the background subtraction unit 142 may calculate the compensated image C as C=g*W, and calculate and output a second background-removed image R as R=X+*W=X(1+g*M).

Figure 4:
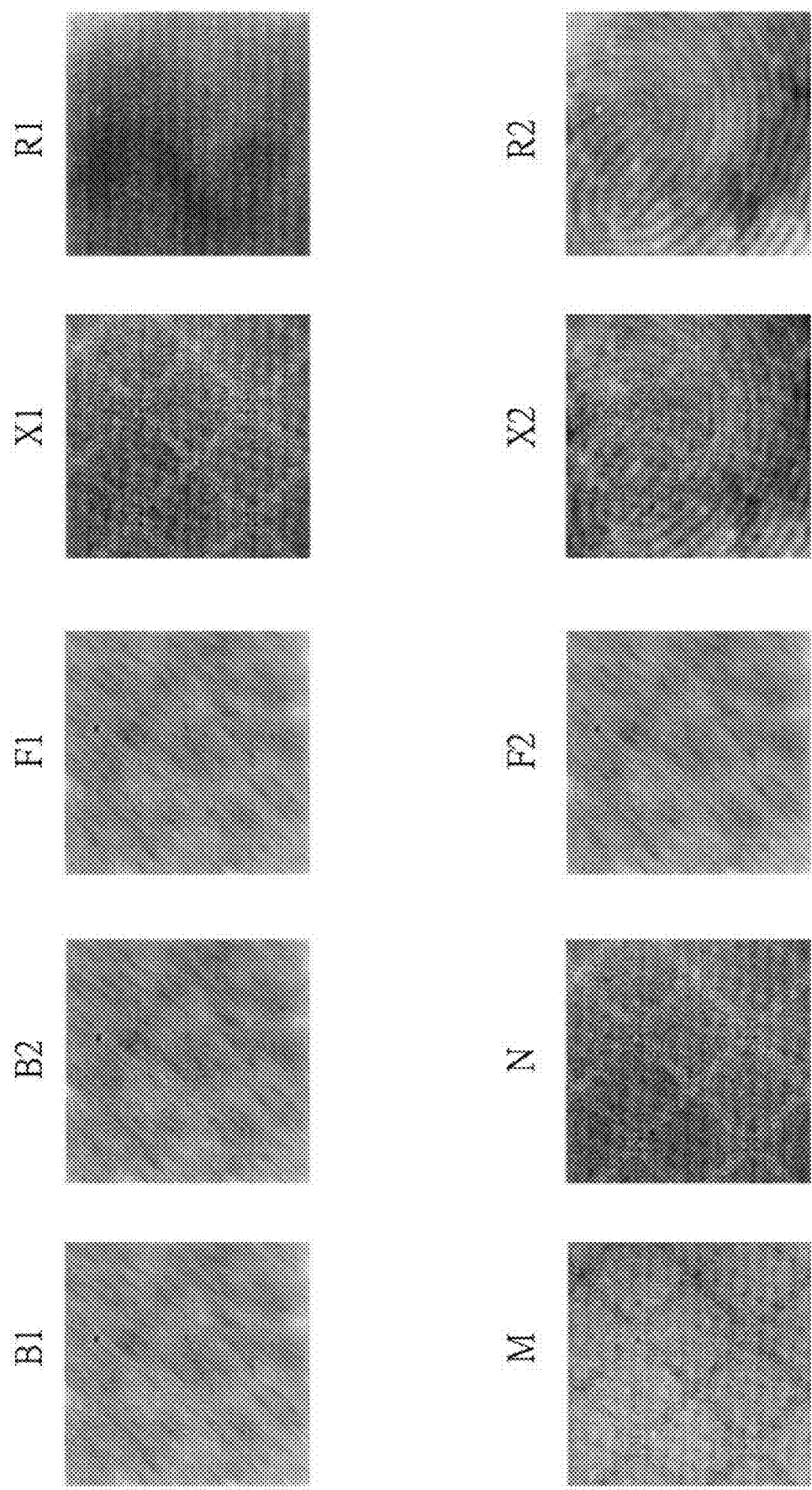
FIG. 4 is a schematic diagram of a plurality of images according to embodiments of the present invention.

Please refer to FIG. 4, FIG. 4 is a schematic diagram of background images B1, B2, a mask image M, an inverse mask image N, target images F1 and F2, first background-removed images X1 and X2, and second background-removed images R1 and R2 according to embodiments of the present invention. In this example, the target image F1 is the target image F captured when the operator of the electronic device 1 covers an object of horizontal strips over the fingerprint sensing region (RGN) of the touch screen 12. The target image F2 is the target image F captured when the operator actually presses his/her finger(s) on the fingerprint sensing region (RGN). The first background-removed images X1 and X2 are results obtained from performing the step 306 to the target images F1 and F2, respectively. The second background-removed images R1 and R2 are results obtained from performing the step 308 to the first background-removed images X1 and X2, respectively.

As can be seen from FIG. 4, the mask image M and the inverse mask image N are in the diamond shape, which reflects the image imaged by the touch-related components/materials/circuits, wherein some pixel positions in the mask image NI is darker (having a smaller mask pixel value) whereas some pixel positions are brighter (having a larger mask pixel value). The inverse mask image N has a larger inverse mask pixel value at pixel positions with a smaller mask pixel value, and has a smaller inverse mask pixel value at pixel positions with a larger mask pixel value. The target image F1 has fine horizontal stripe signals, whereas the target image F2 has fine fingerprint signals. The first background-removed image X1 comprises a combined image of the image formed from the diamond-shaped circuit structure and the horizontal strips signals, whereas the first background-removed image X2 comprises a combined image of the image formed from the diamond-shaped circuit structure and the fingerprint signal. As can be ascertain from the second background-removed images R1 and R2, the image module 14 may effectively eliminate the image, corresponding to the diamond-shaped circuit structure, in the first background-removed images X1 and X2 by performing the step 308, so that the second background-removed image R1 has only the horizontal stripe signals, and the second background-removed image R2 has only the fingerprint signals.

Moreover, the first background-removed images X1 and X2 generated from the subtraction calculation of the first stage background are, in fact, the execution results of the existing background subtraction technology. In addition to the first stage background subtraction calculation, the present invention further implements a second stage background subtraction calculation (that is, the step 308). As can be seen from FIG. 4, the second background-removed images R1 and R2 generated by the second stage background subtraction calculation according to the present invention may further eliminate the interference to the image, as compared with the existing technology.

Moreover, to increase the convenience to users, the image module 14 may, during a calibration stage before the product delivery, first calculate the background images B1 and B2, mask image M and inverse mask image N, and store the same in a storage unit (not illustrated in FIG. 1). After the product delivery, when the user presses his/her finger(s) on the fingerprint sensing region RGN, the image module 14 may capture the target image F in real-time and calculate the first background-removed image X and the second background-removed image R.

It should be noted that the above-mentioned embodiments are used to explained the concept of the present invention, and persons having ordinary skill in the art may made various modifications based on the foregoing, and the present inventions are not limited thereto. For example, the mask image M is not limited to the quotient of the first background image B1 and the second background image 132. In one embodiment, the mask image M may be M=(B1*B1)/(B2*B2)=B1$^2$/B2$^2$, or M=B1$^n$/B2$^n$, wherein B1$_n$(B2$^n$) represents the B1(B2) to the n$^{th}$ power, as long as a mask value in the mask image M may show/represent the relative value of the first background image B1 relative to the second background image B2. These variations all belong to the scope of the present invention. Moreover, when recording the background images B1 and B2, the image module 14 may first implement a temperature compensation operation, so as to reduce the effect of the temperature on the background image B1 and B2. Moreover, considering the cases where the user does not press his/her fingers) on the whole fingerprint sensing region RGN, the image module 14 may first implement image segmentation to the image captured by the image capturing unit 140, and the segmented images may be used as the target image F. Moreover, the background subtraction unit 142 may implement the binarization calculation to the mask image M. and the use of the binarized mask image M to calculate the second background-removed image R also falls within the scope of the present invention. Moreover, the first object and the second object are not limited to those of black or white and may have another color, as long as the first object and the second object have different reflectivity to light. These variations also fall within the scope of the present invention.

In view of the foregoing, the present invention uses objects having different reflectivity/color to create a first background image and a second background image, and uses a mask image generated according to the first background image and second background image, so as to use a first background-removed image generated from a first stage background subtraction (the existing background subtraction technology) calculation to further implement a second stage background subtraction calculation. Compared with the existing technology, the present invention may further eliminate the interference to the image.

The foregoing outlines a portion of embodiments of the present disclosure, and shall not be used to limit the present application; any modification, equivalent substitution or improvement made within the spirits and principles of the present application shall be included in the scope of protection of the present application.

What is claimed is:

1. A background subtraction method for a background subtraction module, wherein the background subtraction method comprises:
    obtaining a first background image corresponding to a first object, wherein the first object has a uniform color and has a first reflectivity;
    obtaining a second background image corresponding to a second object, wherein the second object has a uniform color and has a second reflectivity, and the first reflectivity and the second reflectivity are different;
    dividing a plurality of first pixel values of the first background image to the power of one or more by a plurality of second pixel values of the second background image to the power of one or more to obtain the plurality of relative values of the first background image relative to the second background image to obtain a mask image;
    obtaining a target image;
    subtracting the second background image from the target image to obtain a first background-removed image;
    multiplying the first background-removed image by the mask image to obtain a first mask-multiplied image;
    calculating a compensation coefficient according to the first background-removed image, the mask image and the first mask-multiplied image;
    multiplying the first mask-multiplied image by the compensation coefficient to obtain a compensated image; and
    adding the first background-removed image and the compensated image to generate the second background-removed image.

2. The background subtraction method of claim 1, wherein the step of calculating the compensation coefficient according to the first background-removed image, the mask image and the first mask-multiplied image comprises:
    multiplying the first mask-multiplied image by the mask image to obtain a second mask-multiplied image;
    generating an inverse mask image according to the mask image;
    multiplying the first background-removed image by the inverse mask image to obtain a first inverse mask-multiplied image;
    multiplying the first inverse mask-multiplied image by the inverse mask image to obtain a second inverse mask-multiplied image; and
    calculating the compensation coefficient according to the first mask-multiplied image, the second mask-multiplied image, the first inverse mask-multiplied image and the second inverse mask-multiplied image.

3. The background subtraction method of claim 2, wherein the step of generating the inverse mask image according to the mask image comprises:
    subtracting the mask image from an all-white image to generate the inverse mask image.

4. The background subtraction method of claim 3, wherein the plurality of relative values are subjected to a normalized operation, so that each mask pixel value in the mask image is between 0 and 1, and each pixel value in the all-white image is 1.

5. The background subtraction method of claim 2, wherein the step of calculating the compensation coefficient according to the first mask-multiplied image, the second mask-multiplied image, the first inverse mask-multiplied image and the second inverse mask-multiplied image comprises:
- obtaining a first mask-averaged value corresponding to the first mask-multiplied image;
- obtaining a first inverse mask-averaged value corresponding to the first inverse mask-multiplied image;
- subtracting the first inverse mask-averaged value from the first mask-averaged value to generate a first subtracted result;
- obtaining a second mask-averaged value corresponding to the second mask-multiplied image;
- obtaining a second inverse mask-averaged value corresponding to the second inverse mask-multiplied image;
- subtracting the second inverse mask-averaged value from the second mask-averaged value to generate a second subtracted result; and
- calculating the compensation coefficient, which is proportional to the ratio of the first subtracted result and the second subtracted result.

6. The background subtraction method of claim 1, wherein the background subtraction module is disposed under a touch screen of an optical fingerprint identification system.

7. An image module, comprising:
- an image capturing unit, configured to capture at least one first image of a first object, at least one second image of a second object and a target image, wherein the first object has a uniform color and has a first reflectivity, the second object has a uniform color and has a second reflectivity, and the first reflectivity and the second reflectivity are different;
- a background subtraction unit, configured to perform the following steps:
  - obtaining a first background image according to the at least one first image, and obtaining a second background image according to the at least one second image;
  - dividing a plurality of first pixel values of the first background image to the power of one or more by a plurality of second pixel values of the second background image to the power of one or more to obtain a plurality of relative values of the first background image relative to the second background image to obtain a mask image;
  - subtracting the second background image from the target image to obtain a first background-removed image;
  - multiplying the first background-removed image by the mask image to obtain a first mask-multiplied image;
  - calculating a compensation coefficient according to the first background-removed image, the mask image and the first mask-multiplied image;
  - multiplying the first mask-multiplied image by the compensation coefficient to obtain compensated image; and
  - adding the first background-removed image and the compensated image to generate the second background-removed image.

8. The image module of claim 7, wherein the background subtraction unit is further configured to perform the following steps to calculate the compensation coefficient according to the first background-removed image, the mask image and the first mask-multiplied image:
- multiplying the first mask-multiplied image by the mask image to obtain a second mask-multiplied image;
- generating an inverse mask image according to the mask image;
- multiplying the first background-removed image by the inverse mask image to obtain a first inverse mask-multiplied image;
- multiplying the first inverse mask-multiplied image by the inverse mask image to obtain a second inverse mask-multiplied image; and
- calculating the compensation coefficient according to the first mask-multiplied image, the second mask-multiplied image, the first inverse mask-multiplied image and the second inverse mask-multiplied image.

9. The image module of claim 8, wherein the background subtraction unit is further configured to perform the following steps to generate the inverse mask image according to the mask image:
- subtracting the mask image from an all-white image to generate the inverse mask image.

10. The image module of claim 9, wherein the plurality of relative values are subjected to a normalized operation so that each mask pixel value in the mask image is between 0 and 1, and each all-white pixel value of the all-white image is 1.

11. The image module of claim 8, wherein the background subtraction unit is further configured to perform the following steps to calculate the compensation coefficient according to the first mask-multiplied image, the second mask-multiplied image, the first inverse mask-multiplied image and the second inverse mask-multiplied image:
- obtaining a first mask-averaged value corresponding to the first mask-multiplied image;
- obtaining a first inverse mask-averaged value corresponding to the first inverse mask-multiplied image;
- subtracting the first inverse mask-averaged value from the first mask-averaged value to generate a first subtracted result;
- obtaining a second mask-averaged value corresponding to the second mask-multiplied image;
- obtaining a second inverse mask-averaged value corresponding to the second inverse mask-multiplied image;
- subtracting the second inverse mask-averaged value from the second mask-averaged value to generate a second subtracted result; and
- calculating the compensation coefficient, which is proportional to the ratio of the first subtracted result and the second subtracted result.

12. An optical fingerprint identification system, disposed in an electronic device, wherein the optical fingerprint identification system comprises:
- a fingerprint identification module; and
- an image module, disposed under a touch screen of the electronic device and coupled to the fingerprint identification module, wherein the image module is an image module comprises:
- an image capturing unit, configured to capture at least one first image of a first object, at least one second image of a second object and a target image, wherein the first object has a uniform color and has a first reflectivity, the second object has a uniform color and has a second reflectivity, and the first reflectivity and the second reflectivity are different;
- a background subtraction unit, configured to obtaining a first background image and a second background image according to the at least one first image and the at least one second image respectively, dividing a plurality of first pixel values of the first background image to the power of one or more by a plurality of second pixel values of the second background image to the power of one or more to obtain a plurality of relative values of the first background image relative to the second background image to obtain a mask image, subtract the second background image from the target image to obtain a first background-removed image, multiply the first background-removed image by the mask image to obtain a first mask-multiplied image, calculate a compensation coefficient according to the first background-removed image, the mask image and the first mask-multiplied image, multiply the first mask-multiplied image by the compensation coefficient to obtain compensated image, and add the first background-removed image and the compensated image to generate the second background-removed image;

wherein the fingerprint identification module receives the second background-removed image to implement fingerprint identification according to the second background-removed image.

\* \* \* \* \*